United States Patent
Fox et al.

(10) Patent No.: US 10,831,442 B2
(45) Date of Patent: Nov. 10, 2020

(54) DIGITAL ASSISTANT USER INTERFACE AMALGAMATION

(71) Applicant: International Business Machines Corporation, Armonk, NY (US)

(72) Inventors: Jeremy R. Fox, Georgetown, TX (US); Gregory J. Boss, Saginaw, MI (US); Kelley Anders, East New Market, MD (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 153 days.

(21) Appl. No.: 16/165,777

(22) Filed: Oct. 19, 2018

(65) Prior Publication Data

US 2020/0125321 A1 Apr. 23, 2020

(51) Int. Cl.
| | |
|---|---|
| *G06F 3/16* | (2006.01) |
| *H04R 1/04* | (2006.01) |
| *G06K 9/00* | (2006.01) |
| *G06F 3/01* | (2006.01) |
| *G06N 20/00* | (2019.01) |
| *G10L 15/24* | (2013.01) |
| *G10L 15/28* | (2013.01) |

(Continued)

(52) U.S. Cl.
CPC .............. *G06F 3/167* (2013.01); *G06F 3/017* (2013.01); *G06K 9/00302* (2013.01); *G06K 9/00335* (2013.01); *G06N 20/00* (2019.01); *G10L 15/063* (2013.01); *G10L 15/065* (2013.01); *G10L 15/24* (2013.01); *G10L 15/25* (2013.01); *G10L 15/28* (2013.01); *H04R 1/04* (2013.01); *G10L 2015/223* (2013.01); *G10L 2015/225* (2013.01); *G10L 2015/226* (2013.01)

(58) Field of Classification Search
CPC ..... G10L 15/063; G10L 15/065; G10L 15/07; G10L 15/22; G10L 2015/223; G10L 2015/225; G10L 2015/226; G10L 15/24; G10L 15/25; G10L 15/26; G10L 15/28
See application file for complete search history.

(56) References Cited

U.S. PATENT DOCUMENTS 5,027,406 A * 6/1991 Roberts ................. G10L 15/063
704/244
5,899,972 A 5/1999 Miyazawa et al.
(Continued)

OTHER PUBLICATIONS

Marshall, "Enhancing speech recognition and speech understanding systems through non-phonetic cues," 1998 IEEE International Conference on Systems, Man, and Cybernetics, San Diego, CA, Aug. 1998, pp. 4139-4147.

(Continued)

*Primary Examiner* — Eric Yen
(74) *Attorney, Agent, or Firm* — Vanleeuwen & Vanleeuwen; Alexander G. Jochym

(57) ABSTRACT

An approach is provided that receives, from a user, an amalgamation at a digital assistant. The amalgamation includes one or more words spoken by the user that are captured by a digital microphone and a set of digital images corresponding to one or more gestures that are performed by the user with the digital images captured by a digital camera. The system then determines an action that is responsive to the amalgamation and then performs the determined action.

17 Claims, 6 Drawing Sheets

(51) Int. Cl.
*G10L 15/065* (2013.01)
*G10L 15/25* (2013.01)
*G10L 15/06* (2013.01)
*G10L 15/22* (2006.01)

(56) References Cited

U.S. PATENT DOCUMENTS

| | | | | |
|---|---|---|---|---|
| 6,873,951 B1* | 3/2005 | Lin | | G10L 15/065 379/88.01 |
| 9,182,826 B2 | 11/2015 | Powledge et al. | | |
| 2002/0087312 A1* | 7/2002 | Lee | | G06Q 30/06 704/251 |
| 2002/0135618 A1* | 9/2002 | Maes | | G10L 15/24 715/767 |
| 2002/0178004 A1* | 11/2002 | Chang | | G10L 15/07 704/246 |
| 2003/0014260 A1* | 1/2003 | Coffman | | G10L 15/22 704/275 |
| 2003/0216919 A1 | 11/2003 | Roushar | | |
| 2004/0054538 A1* | 3/2004 | Kotsinadelis | | G10L 15/22 704/270 |
| 2004/0111267 A1* | 6/2004 | Jadhav | | G10L 15/26 704/270 |
| 2005/0125234 A1* | 6/2005 | Endo | | G10L 15/26 704/275 |
| 2007/0005206 A1* | 1/2007 | Zhang | | G06F 3/16 701/36 |
| 2007/0233497 A1* | 10/2007 | Paek | | G10L 15/22 704/270 |
| 2008/0091426 A1 | 4/2008 | Rempel et al. | | |
| 2008/0301135 A1 | 12/2008 | Alves et al. | | |
| 2010/0280983 A1* | 11/2010 | Cho | | G10L 15/22 706/46 |
| 2011/0112921 A1* | 5/2011 | Kennewick | | G06Q 30/0601 705/26.1 |
| 2011/0301956 A1* | 12/2011 | Sano | | G10L 15/26 704/270 |
| 2012/0022872 A1* | 1/2012 | Gruber | | G06F 3/167 704/270.1 |
| 2012/0215538 A1* | 8/2012 | Cleasby | | H04M 3/5175 704/251 |
| 2013/0110804 A1 | 5/2013 | Davis et al. | | |
| 2013/0159001 A1* | 6/2013 | Stifelman | | G06F 3/0482 704/257 |
| 2014/0222436 A1* | 8/2014 | Binder | | G10L 21/16 704/275 |
| 2014/0278435 A1 | 9/2014 | Ganong, III et al. | | |
| 2014/0310001 A1* | 10/2014 | Kalns | | G10L 15/32 704/270.1 |
| 2014/0324648 A1* | 10/2014 | Mori | | G06F 3/167 705/31 |
| 2015/0149177 A1* | 5/2015 | Kalns | | G10L 15/1822 704/257 |
| 2017/0060994 A1* | 3/2017 | Byron | | G10L 15/22 |
| 2017/0140041 A1 | 5/2017 | Dotan-Cohen et al. | | |
| 2017/0345424 A1* | 11/2017 | Ikeno | | G10L 15/24 |
| 2018/0232436 A1* | 8/2018 | Elson | | G06F 16/3344 |
| 2019/0027134 A1* | 1/2019 | Kakirwar | | G06F 3/167 |
| 2020/0143806 A1* | 5/2020 | Sreedhara | | G06K 9/00241 |

OTHER PUBLICATIONS

Sreekanth et al., "Audio Visual Technique for Enhancing the Isolated Word Speech Recognition System," International Journal of Advanced Research in Computer Science, vol. 8, No. 3, Mar.-Apr. 2017, pp. 884-888.

Burger et al., "Two-handed gesture recognition and fusion with speech to command a robot," Journal Autonomous Robots, vol. 32 Issue 2, Dec. 2011, pp. 129-147.

Johnson, "Amazon's Alexa wants to learn more about your feelings," https://venturebeat.com/2017/12/22/amazons-alexa-wants-to-learn-more-about-your-feelings/, Dec. 22, 2017, 4 pages.

IBM, "Method for improving the voice recognition rate by using additional input devices," IP.com Disclosure No. IPCOM000030807D, Original Publication Date: Aug. 27, 2004, 3 pages.

Agarwal et al., "Remembering what you said: Semantic personalized memory for personal digital assistants," 2017 IEEE International Conference on Acoustics, Speech and Signal Processing (ICASSP), New Orleans, LA, Mar. 2017, pp. 5835-5839.

Bhuiyan, "Watson Tone Analyzer: 7 new tones to help understand how your customers are feeling," International Business Machines Corporation, Apr. 26, 2017, 8 pages.

\* cited by examiner

DIGITAL ASSISTANT USER INTERFACE AMALGAMATION

BACKGROUND OF THE INVENTION

Description of Related Art

Digital, or virtual, assistants are increasingly popular with users as these assistants can perform tasks or services for the user and otherwise make life somewhat easier for the users. Many large companies include digital assistants with their software and hardware offerings making such hardware and software easier to use. In addition, many of these virtual assistance use voice technology and natural language processing (NLP) so that users can interface with the software and devices using voice commands. This allows hands-free operation of the assistant so that the user can be otherwise occupied, such as when requesting a digital assistant play a particular musical offering or provide route information when the user is driving an automobile.

SUMMARY

An approach is provided that receives, from a user, an amalgamation at a digital assistant. The amalgamation includes one or more words spoken by the user that are captured by a digital microphone and a set of digital images corresponding to one or more gestures that are performed by the user with the digital images captured by a digital camera. The system then determines an action that is responsive to the amalgamation and then performs the determined action.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below. Users can utilize a digital assistant to submit their voice command and accordingly they can control home network devices, sensors, and many electronic devices, such as lights, etc. While speaking, some people do not find the correct words to explain the spoken commands they want to use, or do not know the the descriptive word to explain the context of what they are trying to convey to the digital assistant device. In addition, with respect to devices where more than one of the device is found in an environment, such as lights in a home, traditional systems often require the user to assign unique names to each of the devices and then remember such assigned names when issuing a voice command directed to such device.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
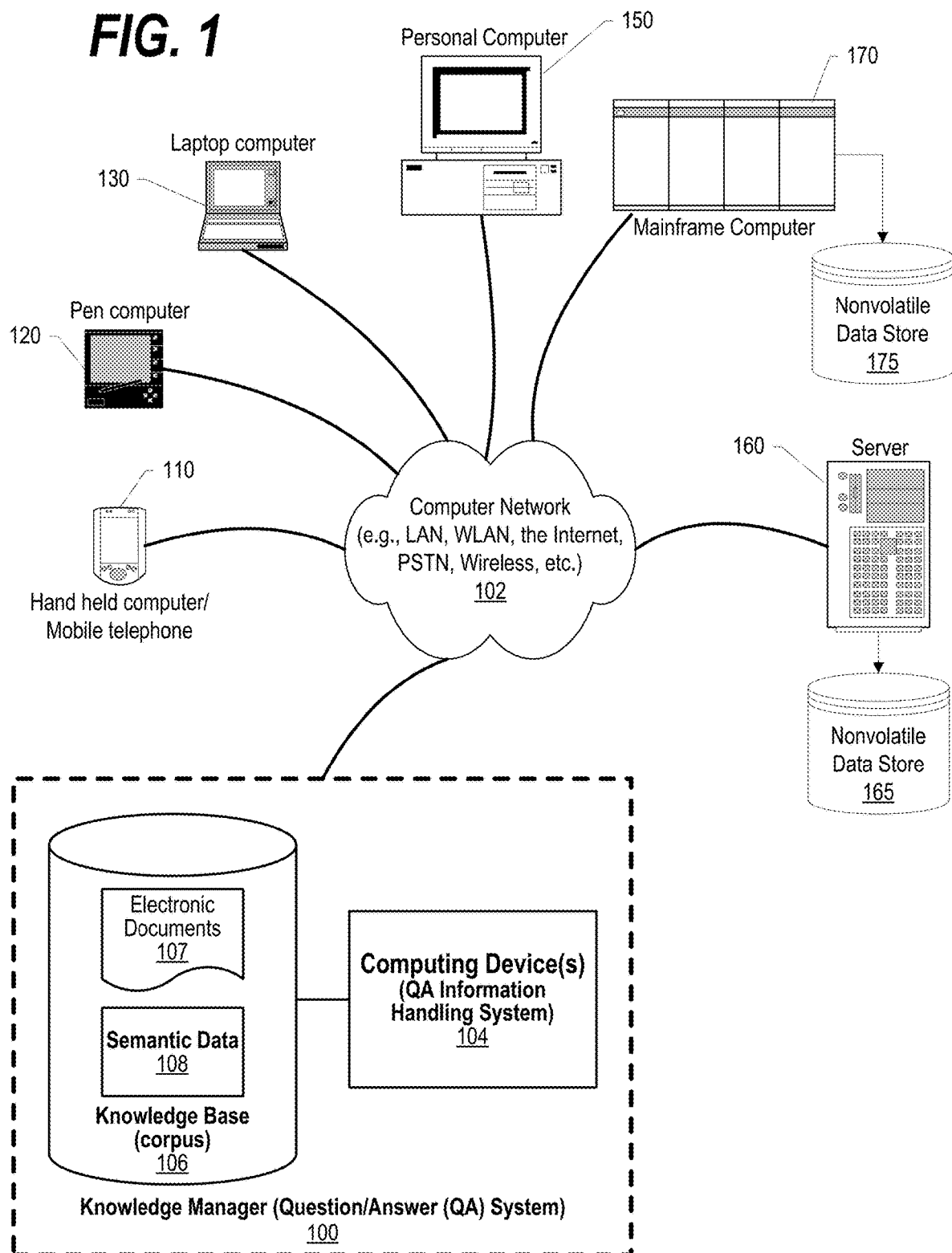
FIG. 1 depicts a network environment that includes a knowledge manager that utilizes a knowledge base.

FIGS. 1-6 describe an approach that prepares a user response amalgamation summary for a user based on voice commands, gestures, and examples initially provided by the user through a digital assistant. The user's ability to provide a combination of voice commands, gestures, and examples will be combined and processed through a corpus of data relating to each subject matter based on known knowledge pertaining to the metadata of the subject.

The approach presented herein provides a method to communicate a response amalgamation based summary on unique command driven verbal interface. This approach further provides a method to determine the portion of a command phrase that is ambiguous based on user's facial and tone analysis. The approach also analyzes a user's gestures to augment understanding of an ambiguous command phrase, and also learns from failed amalgamations to derive an action based on the amalgamation that is accepted by the user.

The approach allows the user to perform one or more hand gestures to explain the words etc. For example, to submit a command, the user has submitted vocal words and one or more gestures to explain a topic they want to communicate. The approach enables the AI based voice response system to understand such combination (Voice+Gesture) amalgamation commands and uses self-learning techniques to associate the amalgamations with appropriate actions. In this case, the AI system understands (1) which are confirmed voice command that include an amalgamation (voice+gesture), and (2) cases where the user is struggling to explain a desired action (based on user's facial expressions, etc.),—so that the AI responsively interprets the amalgamation and the responsive action. For example, a user can point (gesture) to a light in a particular room, such as a family room, and issue a vocal command request such as "system, turn off that light." The digital assistant system inputs the spoken words and the gesture to identify the particular light that is requested as part of the action and responds by turning the desired light off. In some cases, training is required to teach the system what is meant by a particular amalgamation, such as the difference between the table light in the family room (user points toward table) and an overhead light in the same family room (user points towards ceiling).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
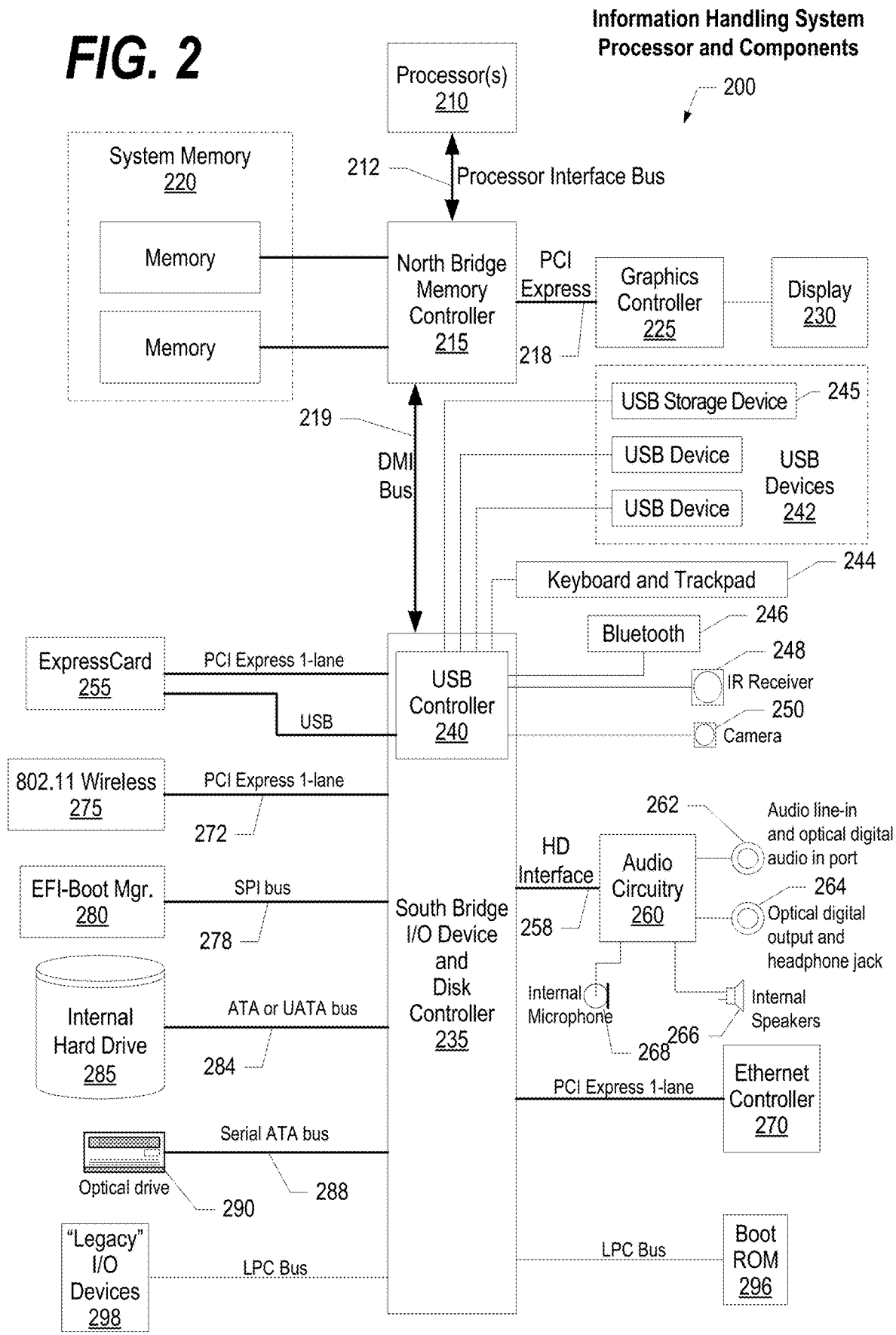
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
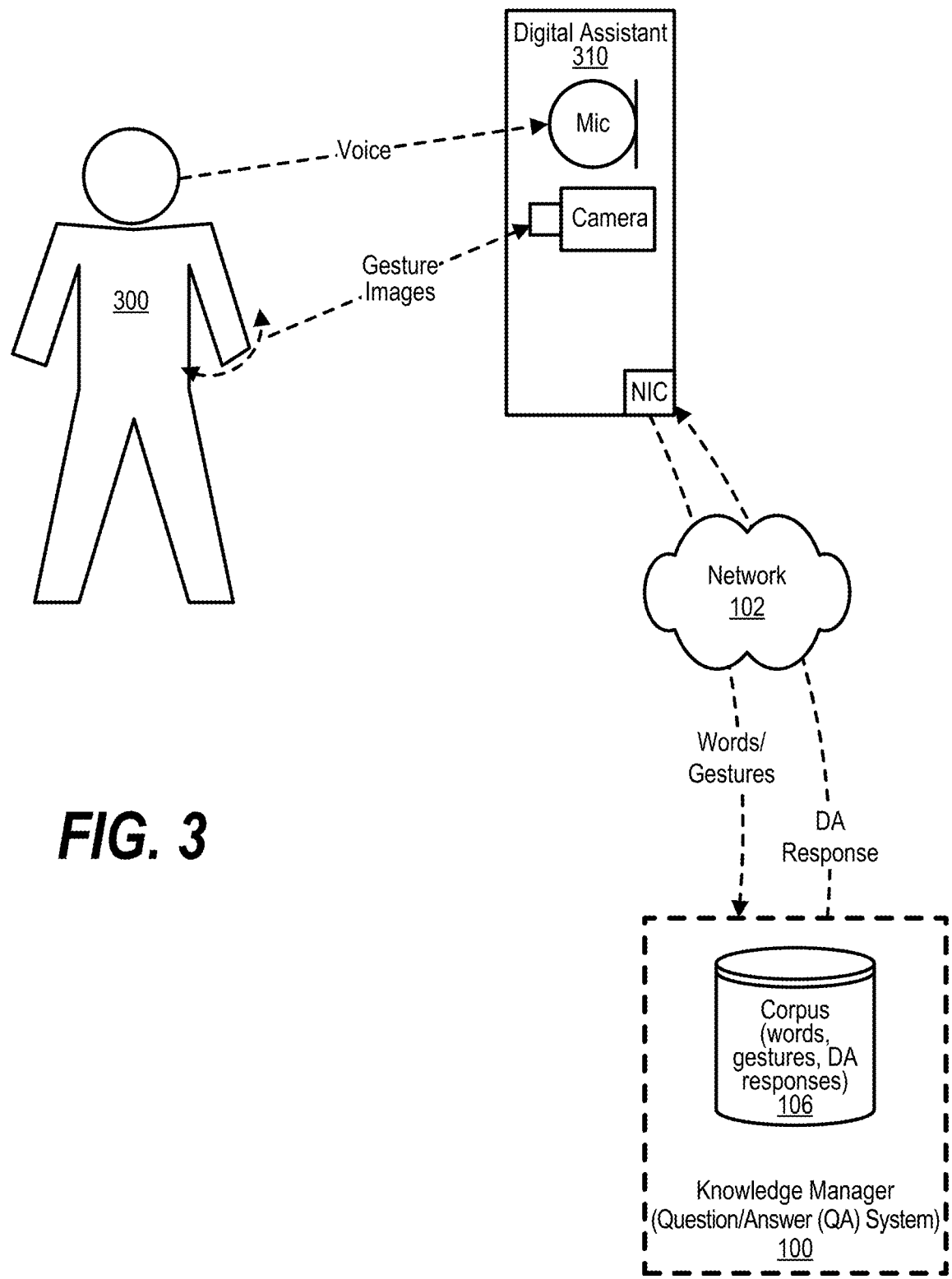
FIG. 3 is a component diagram that shows a user interacting with a digital assistant that further processes the user's words and actions using a question answering (QA) system.

FIG. 3 is a component diagram that shows a user interacting with a digital assistant that further processes the user's words and actions using a question answering (QA) system. User 300 utilizes digital assistant 310 that may be a stand alone device equipped with a digital microphone and a digital camera or the digital assistant can be a software application deployed on an information handling system, such as a computer system, tablet computer system, smart phone, etc., with hardware that includes a digital microphone and a digital camera. User 300 provides vocal words (words spoken by the user) as well as performs gestures with various parts of the user's body, such as by moving the user's hands, arms, legs, etc. The combination of the words spoken by the user and the gestures performed by the user form an amalgamation that is received by the microphone (spoken words) and digital camera (gestures) at the hardware platform on which digital assistant 310 is running. Digital assistant 310 can include any or all of the components shown for an information handling system shown and described in FIG. 2.

In one embodiment, the system utilizes a knowledge manager, such as question-answering (QA) system 100 that is accessed by the digital assistant via computer network 102, such as the Internet. The digital assistant, with or without utilization of QA system 100, determines a meaning of the gesture that was performed by the user and uses natural language processing (NLP) to derive a meaning from the words spoken by the user. The combination of the meaning of the words and the meaning of the gesture are combined to form an amalgamation that is then used to determine responsive action that is performed by the digital assistant. For example, a user might point at a light in a family room (gesture) and say words such as "system, turn on that light." The system derives a meaning of the gesture to identify a particular device identifier corresponding to the light to which the user is pointing and derives a meaning from the spoken words (e.g., "turn device on"), combines the words with the meaning of the gesture (e.g., "TURN DEVICE LAMP0234 ON," etc.) and performs the action. In an embodiment utilizing QA system 100, the amalgamation (words+gesture) are transmitted to QA system 100 via network 100, the QA system determines the appropriate response (action) and returns the action that the digital assistant is to perform back to the digital assistant via the computer network. Amalgamation and corresponding actions are stored in corpus 106 that is utilized by the QA system.

A machine learning system, such as one employed by QA system 100, can be trained to learn new or different commands. In one embodiment, the user can provide non-visual feedback such as a facial gesture (e.g., frown or shake head "no" if action performed is incorrect, etc.). For example, if a new lamp module is installed for a second lamp in the family room, and the user issues the command "system, turn that lamp on" with a gesture pointing to the new lamp, the system might determine that the lamp to which the user is pointing is different from the lamp already known by the system (the first lamp) and then may perform an action to turn on the new lamp. However, if the new second lamp is proximate to the preexisting first lamp and the user points to the new second lamp with the voice command, the system might perform an incorrect action and turn on the first, rather than the second, lamp. The user could provide a non-verbal response, such as a frown or "no" head shake, to which the user would reverse the previous action taken and try a different action, in this case turning off the first lamp and turning on the second lamp. In one embodiment, the user can provide positive feedback, such as saying "correct" or providing positive non-verbal feedback such as nodding head "yes" to indicate that the action performed by the digital assistant was the desired action. The digital assistant can utilize the feedback provided by the user to further train the system regarding amalgamations received from the user at the digital assistant.

When the user provides a feedback indicating that an incorrect action was performed in response to the amalgamation, the user can provide further amalgamations to train the digital assistant system regarding the correct action that corresponds to the amalgamation. The amalgamations, actions, and responses are used to train the digital assistant so that the next time the amalgamation is performed, because of the training, there is a greater likelihood that the digital assistant system will retrieve and perform the correct action that corresponds to the amalgamation. In one embodiment, the training is performed in QA system 100 utilized by digital assistant 310.

Meaning of both the received gesture and the received spoken words is performed in a way that derives meaning of the gesture based on the spoken words and, conversely, derives meaning of the spoken words based on the gesture. The digital assistant determines a meaning of the gesture that was received from the user using previously ingested gestures (e.g., pointing, swiping, turning, etc.). The digital assistant also determines a set of ingested words, previously ingested to the QA system's corpus 106, that relate to the words that were spoken by the user with the set of ingested words being determined based on the determined meaning of the gesture. The action that is retrieved is based on the combination of the set of ingested words and the meaning of the gesture.

Figure 4:
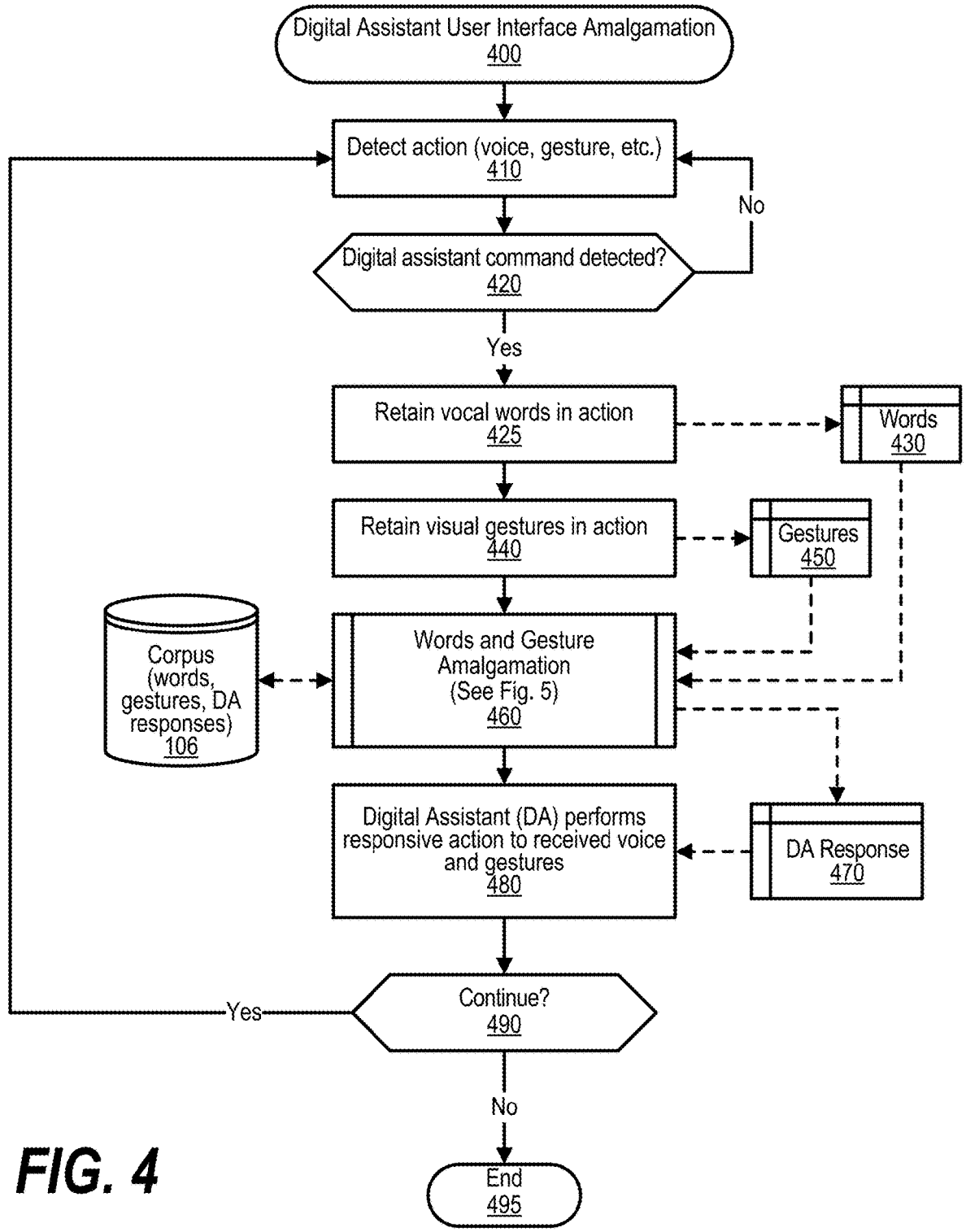
FIG. 4 is a depiction of a flowchart showing the logic used to perform a digital assistant user interface amalgamation.

FIG. 4 is a depiction of a flowchart showing the logic used to perform a digital assistant user interface amalgamation routine. FIG. 4 processing commences at 400 and shows the steps taken by a process that performs a digital assistant user interface amalgamation routine. At step 410, the process detects an action by the user, such as a spoken words from the user, gestures performed by the user, and the like. The process determines whether a digital assistant command was detected from the user (decision 420). For example, the digital assistant might be programmed to respond to a key word, such as "system" or the name of the digital assistant. For example, the digital assistant might be programmed to respond to a command such as "system, turn on that light" with the user adding a gesture by pointing to the light that the user desires to have turned on. If the digital assistant command is detected, then decision 420 branches to the 'yes' branch to process the command from the user. On the other hand, if a digital assistant command was not detected, then decision 420 branches to the 'no' branch which loops back to step 410 to continue waiting for a command from the user.

When a digital assistant command is detected then steps 425 through 490 are performed. At step 425, the process retains the vocal (spoken) words that the user included in the action command. These words are gathered by a digital microphone, recognized by a speech-to-text routine, and the resulting actual words are stored in data store 430. At step 440, the process retains visual gestures that the user included in the action command. These gestures are gathered by a digital camera, recognized by a gesture interpreter, and the resulting gesture component of the command are stored in data store 450. For example, if the user issued the command, "system, turn on that light" while pointing to a particular light, step 440, then the system would use an image processing routine to detect the particular object (light) being referenced (pointed to) by the user, look up the unique identification of the device (e.g., LIGHT4358) and store the gesture data in data store 450.

Figure 5:
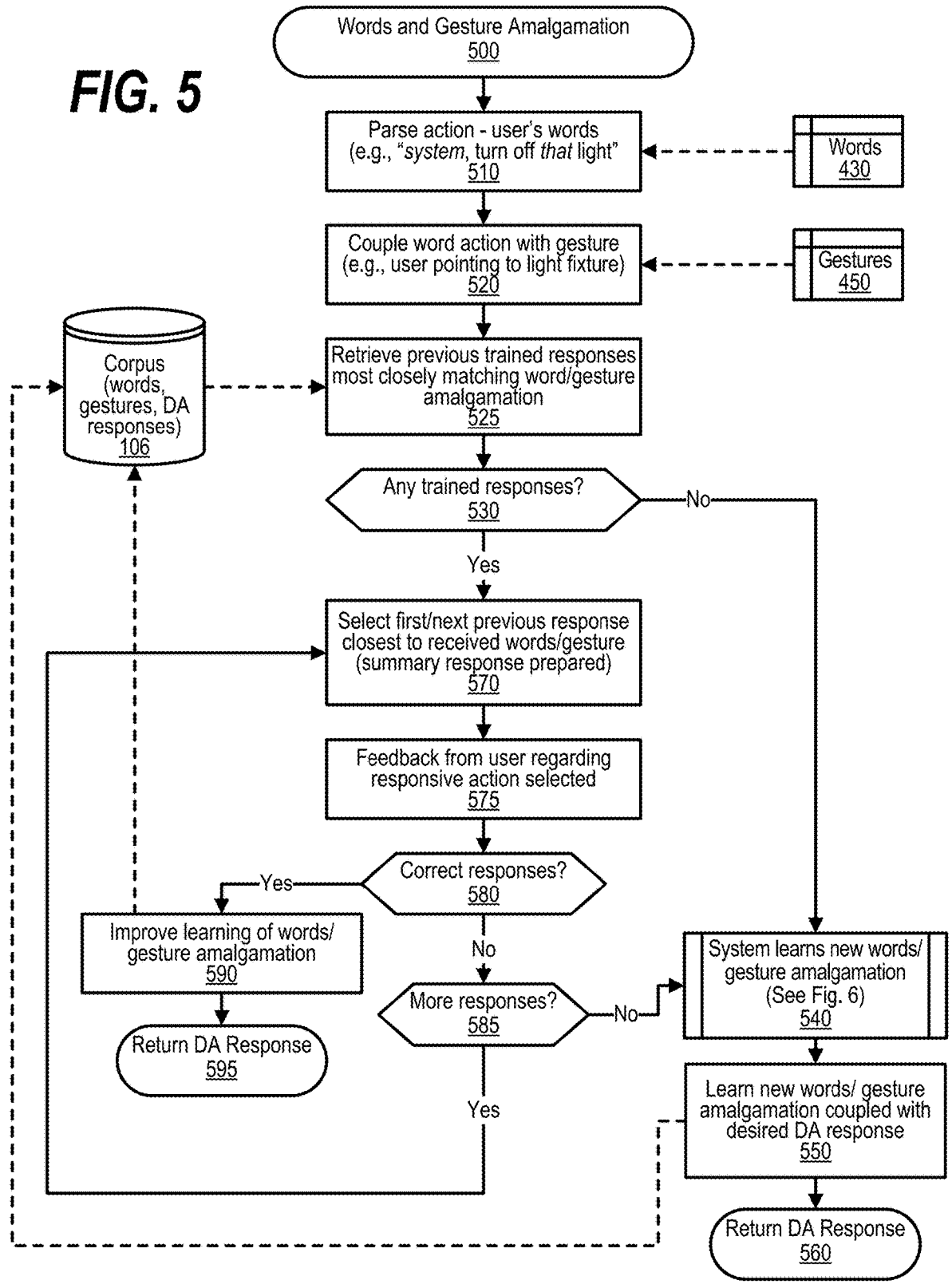
FIG. 5 is a depiction of a flowchart showing the logic used to perform a words and gestures amalgamation as part of the overall user interface amalgamation.

At predefined process 460, the process performs the Words and Gesture Amalgamation routine (see FIG. 5 and corresponding text for processing details). This routine inputs the words stored in data store 430 and the gestures stored in data store 450, analyzes the amalgamation (words+gesture) along with training data stored in corpus 106 to identify a digital assistant action response that is stored in data store 470. For example, using the above example, the digital assistant action response might be "TURN DEVICE LIGHT4368 ON." At step 480, the process digitals Assistant (DA) performs responsive action to the received amalgamation (voice and gestures), such as by turning on the light requested by the user that issued the command "system, turn on that light" while pointing to the light of interest." The process determines as to whether the system continues to operate (decision 490). In one embodiment, the system, once it determines an action responsive to the received amalgamation, transmits a command to a server in communication with and which has a capability to control of devices, appliances and systems, such as heating, ventilation, and air conditioning ("HVAC") system, lighting systems, home theater, entertainment systems, and security systems.

In one embodiment, the system passively remains operational in the background waiting for the user to issue further commands to the digital assistant, in which case, decision 490 branches to the 'yes' branch which loops back to step 410 to wait for the next action from the user and respond appropriately as described above. This looping continues until the system is turned off, at which point decision 490 branches to the 'no' branch exiting the loop and processing thereafter ends at 495.

FIG. 5 is a depiction of a flowchart showing the logic used to perform a words and gestures amalgamation as part of the overall user interface amalgamation. FIG. 5 processing commences at 500 and shows the steps taken by a process that identifies a particular action corresponding to a received amalgamation that included words and gestures provided by the user. This routine can be performed by a digital assistant or can be performed by a network-accessible knowledge manager, such as a QA system, shown in FIGS. 1-3.

At step 510, the process parses action included in the user's words such as the command, "system, turn off that light". At step 520, the process couples the word action with the gesture provided by the user, such as the user pointing to a particular light fixture. At step 525, the process retrieves previous trained responses that most closely match the word/gesture amalgamation that was received from the user.

The process determines as to whether there are any trained responses corresponding to the amalgamation (decision 530). If there are trained responses, then decision 530 branches to the 'yes' branch to process the responses. On the other hand, if there are no trained responses for the amalgamation, then decision 530 branches to the 'no' branch to train the system. When an action corresponding to the amalgamation cannot be identified, then steps 540 through 560 are performed. At predefined process 540, the systems learns new words/gesture amalgamation using the routine shown in FIG. 6. At step 550, the process learns new words/gesture amalgamation coupled with the desired digital assistant action response with the amalgamation and corresponding action stored as training data in corpus 106. After the system is properly trained for the new amalgamation and corresponding responsive digital assistant action, then FIG. 5 processing returns to the calling routine (see FIG. 4) at 560 with the responsive digital assistant action that the system is to perform.

If the system is already trained for the received amalgamation, then steps 570 through 595 are performed. At step 570, the process selects the first previous digital assistant action response that is closest to the received words/gesture amalgamation. In one embodiment, a summary response is prepared indicating the action that has been selected. At step 575, the process receives feedback from the user indicating whether the action selected by the user is correct or incorrect. The feedback can be a non-verbal or verbal response. An example of a non-verbal response would be a facial gesture or movement, such as a frown or shaking head "no" if incorrect, or a smile or nodding head "yes" if correct. If the user indicates that the correct responsive action was selected by the user, then decision 580 branches to the 'yes' branch to perform steps 590 through 595. On the other hand, if the user indicates that an incorrect responsive action was selected, then decision 580 branches to the 'no' branch for further processing.

If the selected responsive action was incorrect, then decision 580 branches to 'no' branch whereupon the process determines whether there are more available responsive actions to process (decision 585). If there are more available responsive actions, then decision 585 branches to the 'yes' branch which loops back to step 570 to select and inform the user of the next action response that is next closest to the received amalgamation.

This looping continues until there are no more responsive actions to process, at which point decision 585 branches to the 'no' branch exiting the loop to perform steps 540 through 580 to learn a new action response to the received amalgamation. Returning to decision 580, if the responsive action selected by the system was correct as indicated by the user then, at step 590, the process improves the learning of the system of the received amalgamation and responsive action by storing the learned data into corpus 106 FIG. 5 processing thereafter returns to the calling routine (see FIG. 4) at 595 with a response that the correct action was selected by the system.

Figure 6:
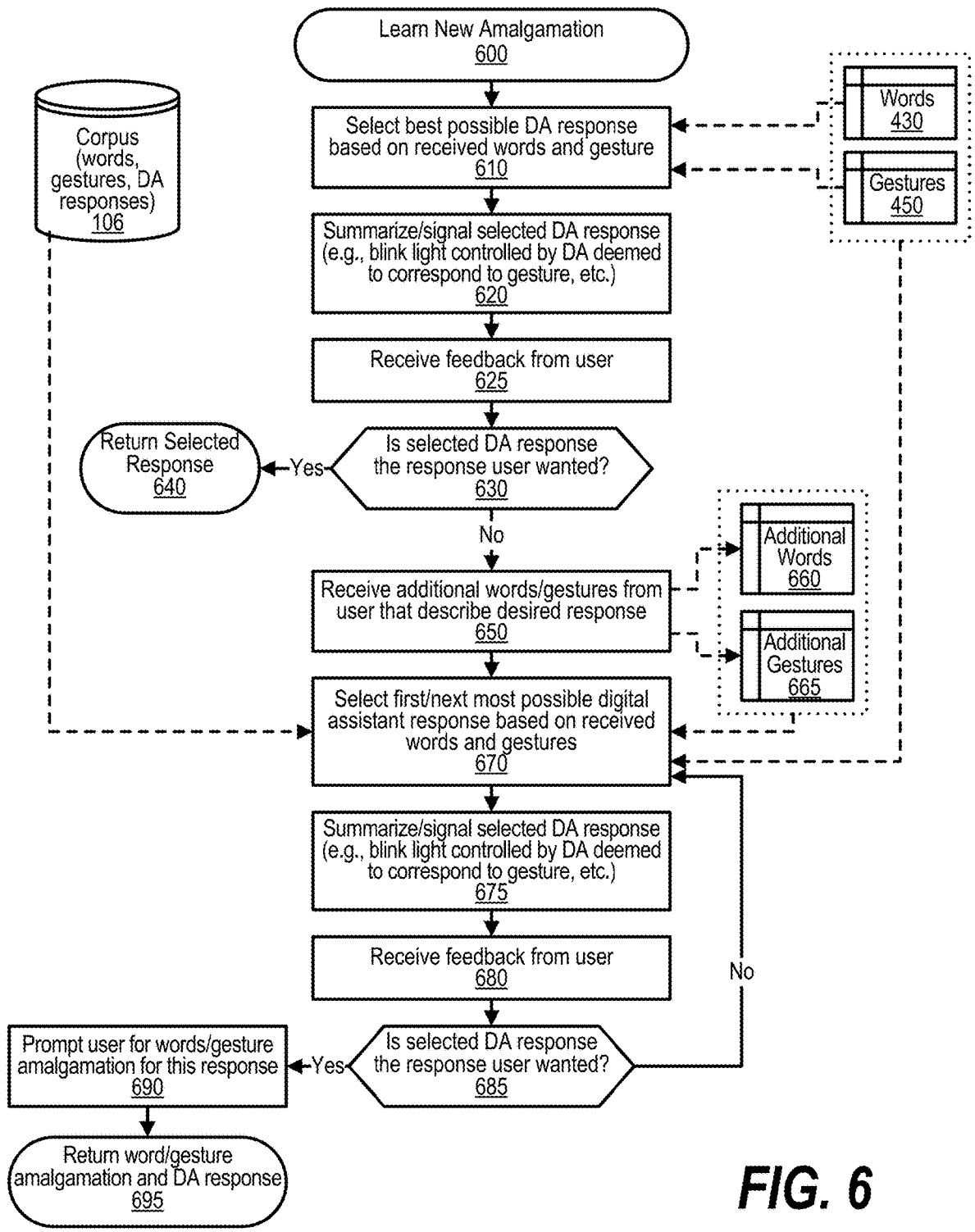
FIG. 6 is a depiction of a flowchart showing the logic used to perform learning actions by the system to learn new words and gestures found in received amalgamations.

FIG. 6 is a depiction of a flowchart showing the logic used to perform learning actions by the system to learn new words and gestures found in received amalgamations. FIG. 6 processing commences at 600 and shows the steps taken by a process that learns new amalgamation/action combinations. The processing shown in FIG. 6 can be performed by the digital assistant or by a knowledge manager utilized by the digital assistant, such as QA system 100 shown in FIGS. 1-3.

At step 610, the process selects best possible digital assistant action response based on the amalgamation (words+gestures) received from the user. The words were previously stored in data store 430 and the gestures were previously stored in data store 450, so step 610 retrieves the words and gestures from these data stores. At step 620, the process summarizes, signals, or otherwise notifies the user of the selected digital assistant action response. For example, the system might blink a light controlled by the digital assistant that was determined to correspond to a user's gesture pointing at a particular light. At step 625, the process receives feedback from user. The feedback can be verbal or non-verbal. Non-verbal feedback might be the user shaking head "no" to indicate an incorrect action, nodding head "yes" to indicate a correct action response, smile to indicate a correct action response, and a frown to indicate an incorrect action response.

The process determines as to whether the selected digital assistant action response is the response that user wanted based on the user's feedback (decision 630). If the digital assistant action response is correct, then decision 630 branches to the 'yes' branch and returns at 640 with the selected digital assistant action response. On the other hand, if the digital assistant action response is incorrect, then decision 630 branches to the 'no' branch for further processing. At step 650, the process receives additional words and/or gestures from the user that describe the desired digital assistant action response. These additional words and gestures are stored in data stores 660 and 665, respectively. For example, if the user pointed at a light and the system initially selected the wrong light, then the additional words might be "system, I meant turn THAT light on" with the user pointing to the desired light, perhaps by standing closer to the desired light so that the system can better differentiate between multiple lights controlled by the system.

At step 670, the process selects the first most possible digital assistant response based on received words and gestures stored in data stores 660 and 665. At step 675, the process summarizes, signals, or otherwise notifies the user of the new selected digital assistant action response. For example, the system might blink a different light controlled by the digital assistant that was determined to better correspond to a user's additional words and gestures when pointing at the light. At step 680, the process receives verbal and/or non-verbal feedback from user. The process determines as to whether, based on the user's feedback, the digital assistant action response is the response that the user wanted (decision 685). If the response is correct, then decision 685 branches to the 'yes' branch to perform steps 690 and 695.

On the other hand, if the response is incorrect, then decision 685 branches to the 'no' branch whereupon processing loops back to step 670 to continue processing the additional words and gestures to identify additional digital assistant action responses that might be the response desired by the user. This looping continues until the correct response is identified. In addition, the user can continue to provide additional words and actions that are stored in data stores 660 and 665 to further assist the digital assistant in responding with the desired digital assistant action response. When the correct digital assistant action response is selected, then steps 690 and 695 are performed. At step 690, the process prompts the user for the amalgamation (words+gesture) for this digital assistant action response with the amalgamation and response learned by the system and stored in corpus 106. FIG. 6 processing thereafter returns to the calling routine (see FIG. 5) at 695.

The inventors have discovered that a digital assistant trained to respond to amalgamations that include both spoken words and physical gestures according to the principles described herein advantageously provides better performance (better accuracy) with respect to actions performed by the digital assistant and is also faster in inference than known conventional approaches that do not employ such an amalgamation. For example, in traditional digital assistants, processing a command such as "turn off the light" is ambiguous without further training the system regarding a particular device (light) name and is further encumbered by the user having to remember the unique identifier assigned to such light. In contrast, with the inventors approach, the user can issue the same verbal command, "turn off the light" and point or otherwise gesture to the light in question. This results in better accuracy and also improves the user interface as the user does not have to pre-define particular names for objects, such as lights, operated by the digital assistant.

In an embodiment, the amalgamation model described herein may be deployed in a deep learning system, such as a QA system. A deep learning model based on convolutional neural networks (CNN) can be utilized to improve the learning of the user's inputted amalgamations. Moreover, the techniques and methods described herein can be applied to any deep learning model, including those based on convolutional neural networks.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   receiving, from a user, an amalgamation at a digital assistant, wherein the amalgamation includes a first set of words spoken by the user and captured by a microphone and a set of digital images corresponding to one or more gestures performed by the user captured by a digital camera;
   determining an action responsive to the amalgamation;
   performing the action by the digital assistant;
   determining that the action is incorrect based on a facial expression received from the user and responsively:
     receiving, from the user, a set of further amalgamations at the digital assistant;
     indicating a set of responsive actions corresponding to the set of further amalgamations;
     receiving a set of user feedback to the set of responsive actions; and
     selecting one amalgamation from the set of further amalgamations based on the set of user feedback; and
   storing the selected amalgamation and a corresponding responsive action from the set of responsive actions in a data store.

2. The method of claim 1 further comprising:
   training a machine learning system, wherein the training includes the determined action and a corresponding amalgamation.

3. The method of claim 1 wherein the set of user feedback comprises a subsequent facial expression of the user captured by the digital camera.

4. The method of claim 1 further comprising:
   receiving, from the user, a second amalgamation at the digital assistant, wherein the second amalgamation includes a second set of words spoken by the user and captured by the microphone and a second set of digital images corresponding to a second set of one or more gestures performed by the user captured by a digital camera;
   identifying that the second amalgamation matches the stored selected amalgamation and responsively receiving the stored corresponding responsive action from the data store; and
   performing, by the digital assistant, the stored corresponding responsive action.

5. The method of claim 1 wherein the selected amalgamation and the stored corresponding responsive action are stored in a question-answering (QA) system.

6. The method of claim 1 further comprising:
   determining a meaning of at least one of the one or more gestures;
   determining a set of ingested words related to the first set of words, wherein the set of ingested words correspond to the determined meaning of the at least one of the one or more gestures; and
   identify the determined action based on the set of ingested words and the meaning of the at least one of the one or more gestures.

7. An information handling system comprising:
   one or more processors;
   a memory coupled to at least one of the one or more processors;
   a digital microphone accessible by at least one of the one or more processors;
   a digital camera accessible by at least one of the one or more processors; and
   a set of computer program instructions stored in the memory and executed by at least one of the one or more processors in order to perform actions comprising:
     receiving, from a user, an amalgamation at a digital assistant, wherein the amalgamation includes a first set of words spoken by the user and captured by the digital microphone and a set of digital images corresponding to one or more gestures performed by the user captured by the digital camera;
     determining an action responsive to the amalgamation;
     performing the action by the digital assistant;
     determining that the action is incorrect based on a facial expression received from the user and responsively:
       receiving, from the user, a set of further amalgamations at the digital assistant;
       indicating a set of responsive actions corresponding to the set of further amalgamations;
       receiving a set of user feedback to the set of responsive actions; and
       selecting one amalgamation from the set of further amalgamations based on the set of user feedback; and
     storing the selected amalgamation and a corresponding responsive action from the set of responsive actions in a data store.

8. The information handling system of claim 7 wherein the actions further comprise:
- training a machine learning system, wherein the training includes the determined action and a corresponding amalgamation.

9. The information handling system of claim 7 wherein the set of user feedback comprises a subsequent facial expression of the user captured by the digital camera.

10. The information handling system of claim 7 wherein the actions further comprise:
- receiving, from the user, a second amalgamation at the digital assistant, wherein the second amalgamation includes a second set of words spoken by the user and captured by the microphone and a second set of digital images corresponding to a second set of one or more gestures performed by the user captured by a digital camera;
- identifying that the second amalgamation matches the stored selected amalgamation and responsively receiving the stored corresponding responsive action from the data store; and
- performing, by the digital assistant, the stored corresponding responsive action.

11. The information handling system of claim 7 wherein the selected amalgamation and the stored corresponding responsive action are stored in a question-answering (QA) system.

12. The information handling system of claim 7 wherein the actions further comprise:
- determining a meaning of at least one of the one or more gestures;
- determining a set of ingested words related to the first set of words, wherein the set of ingested words correspond to the determined meaning of the at least one of the one or more gestures; and
- identify the determined action based on the set of ingested words and the meaning of the at least one of the one or more gestures.

13. A computer program product stored in a computer readable storage medium, comprising computer program code that, when executed by an information handling system, performs actions comprising:
- receiving, from a user, an amalgamation at a digital assistant, wherein the amalgamation includes a first set of words spoken by the user and captured by a microphone and a set of digital images corresponding to one or more gestures performed by the user captured by a digital camera;
- determining an action responsive to the amalgamation;
- performing the action by the digital assistant;
- determining that the action is incorrect based on a facial expression received from the user and responsively:
  - receiving, from the user, a set of further amalgamations at the digital assistant;
  - indicating a set of responsive actions corresponding to the set of further amalgamations;
  - receiving a set of user feedback to the set of responsive actions; and
  - selecting one amalgamation from the set of further amalgamations based on the set of user feedback; and
- storing the selected amalgamation and a corresponding responsive action from the set of responsive actions in a data store.

14. The computer program product of claim 13 wherein the actions further comprise:
- training a machine learning system, wherein the training includes the determined action and a corresponding amalgamation.

15. The computer program product of claim 13 wherein the set of user feedback comprises a subsequent facial expression of the user captured by the digital camera.

16. The computer program product of claim 13 wherein the actions further comprise:
- receiving, from the user, a second amalgamation at the digital assistant, wherein the second amalgamation includes a second set of words spoken by the user and captured by the microphone and a second set of digital images corresponding to a second set of one or more gestures performed by the user captured by a digital camera;
- identifying that the second amalgamation matches the stored selected amalgamation and responsively receiving the stored corresponding responsive action from the data store; and
- performing, by the digital assistant, the stored corresponding responsive action.

17. The computer program product of claim 13 wherein the selected amalgamation and the stored corresponding responsive action are stored in a question-answering (QA) system.

* * * * *